US012615201B2

(12) United States Patent
Hosseini et al.

(10) Patent No.: US 12,615,201 B2
(45) Date of Patent: Apr. 28, 2026

(54) SIDELINK CHANNEL BUSY RATIO MEASUREMENTS FOR SMALLER-BANDWIDTH SLOTS

(71) Applicant: QUALCOMM Incorporated, San Diego, CA (US)

(72) Inventors: Seyedkianoush Hosseini, San Diego, CA (US); Wei Yang, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 18/263,679

(22) PCT Filed: Apr. 14, 2022

(86) PCT No.: PCT/US2022/071712
§ 371 (c)(1),
(2) Date: Jul. 31, 2023

(87) PCT Pub. No.: WO2022/221856
PCT Pub. Date: Oct. 20, 2022

(65) Prior Publication Data
US 2024/0121173 A1 Apr. 11, 2024

(30) Foreign Application Priority Data

Apr. 15, 2021 (GR) ............................... 20210100267

(51) Int. Cl.
*H04L 43/0882* (2022.01)
*H04B 17/318* (2015.01)
(Continued)

700 ⟶

(52) U.S. Cl.
CPC ....... *H04L 43/0882* (2013.01); *H04B 17/328* (2023.05); *H04W 24/10* (2013.01); *H04W 92/18* (2013.01)

(58) Field of Classification Search
CPC .. H04L 43/0882; H04B 17/328; H04W 24/10; H04W 92/18
See application file for complete search history.

(56) References Cited

U.S. PATENT DOCUMENTS

2021/0051510 A1* 2/2021 Chae .................... H04B 17/318
2021/0306885 A1* 9/2021 Hou ...................... H04W 24/10
(Continued)

FOREIGN PATENT DOCUMENTS

EP        3672133 A1    6/2020
EP        3996454 A1    5/2022
WO    WO-2021020954 A1    2/2021

OTHER PUBLICATIONS

CATT, et al., "Discussion on Resource Allocation for Power Saving", 3GPP TSG RAN WG1 Meeting #104-e, R1-2100351, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, XP051970954, 14 Pages.
(Continued)

*Primary Examiner* — Charles C Jiang
*Assistant Examiner* — Ryan C Kavleski
(74) *Attorney, Agent, or Firm* — Harrity & Harrity LLP/Qualcomm Incorporated

(57) ABSTRACT

Various aspects of the present disclosure generally relate to wireless communication. In some aspects, a first user equipment (UE) may receive, from a plurality of second UEs, a plurality of signals over a sidelink interface between the first UE and the second UE. The UE may perform, to one of the plurality of second UEs, a sidelink transmission using
(Continued)

updated transmission parameters based at least in part on a sidelink channel busy ratio (CBR) measurement for a slot, wherein the sidelink CBR measurement for the slot is based at least in part on the plurality of signals and a CBR measurement window that includes one or more of uplink slots or smaller-bandwidth slots. Numerous other aspects are described.

26 Claims, 10 Drawing Sheets

(51) Int. Cl.
  *H04W 24/10*   (2009.01)
  *H04W 92/18*   (2009.01)

(56)      References Cited

U.S. PATENT DOCUMENTS

2022/0272709 A1*   8/2022   Jiang ..................... H04W 72/53

2023/0171741 A1*   6/2023   Ko ........................ H04W 72/54
                  370/329

OTHER PUBLICATIONS

Ericsson: "Congestion Control for NR Sidelink", 3GPP TSG-RAN WG1 Meeting #98bis, R1-1910539, Chongqing, China, Oct. 14-20, 2019, Oct. 20, 2019 (Oct. 20, 2019), 6 Pages, XP051789343, Retrieved from the Internet: URL: http://www.3gpp.org/ftp/tsg_ran/WG1_RL1/TSGR1_98b/Docs/R1-1910539.zip [Retrieved on Oct. 7, 2019] p. 3, lines 22-25 Section 2.2, Section 2.1.
International Search Report and Written Opinion—PCT/US2022/071712—ISA/EPO—Jun. 24, 2022.
Nokia, et al., "Summary#1 of AI 7.2.4.6, QoS Management", 3GPP TSG RAN WG1 #99, R1-1913283, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019, XP051830591, 21 Pages.

* cited by examiner

600

Resource pool for SL

DL slot

UL slot

DL

UL

DL

FD slot with
SL resources

FIG. 6

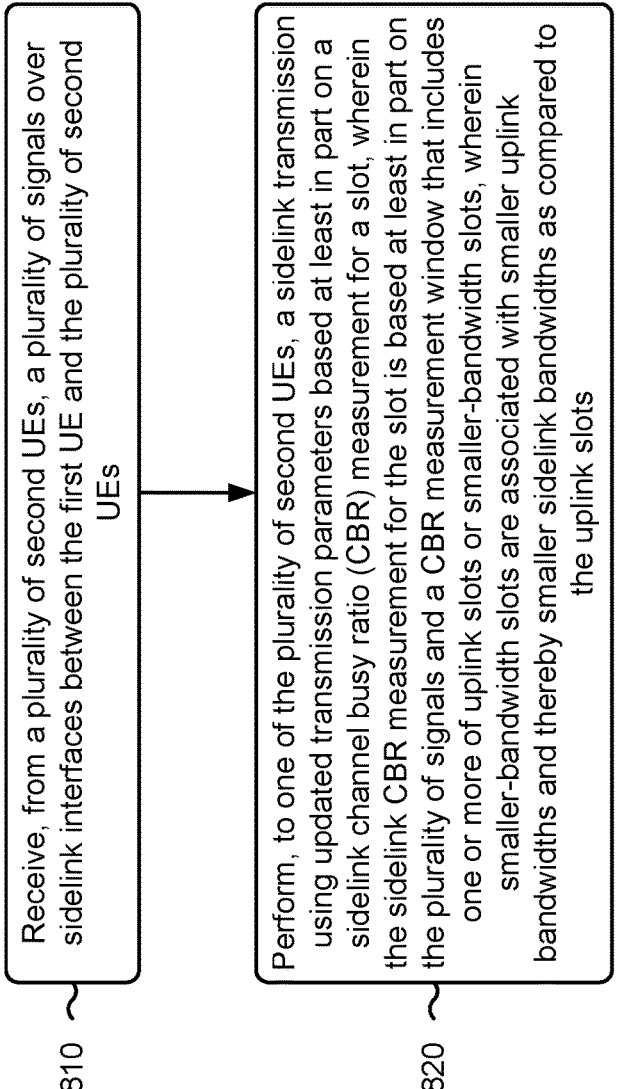

Receive, from a plurality of second UEs, a plurality of signals over sidelink interfaces between the first UE and the plurality of second UEs

810

Perform, to one of the plurality of second UEs, a sidelink transmission using updated transmission parameters based at least in part on a sidelink channel busy ratio (CBR) measurement for a slot, wherein the sidelink CBR measurement for the slot is based at least in part on the plurality of signals and a CBR measurement window that includes one or more of uplink slots or smaller-bandwidth slots, wherein smaller-bandwidth slots are associated with smaller uplink bandwidths and thereby smaller sidelink bandwidths as compared to the uplink slots

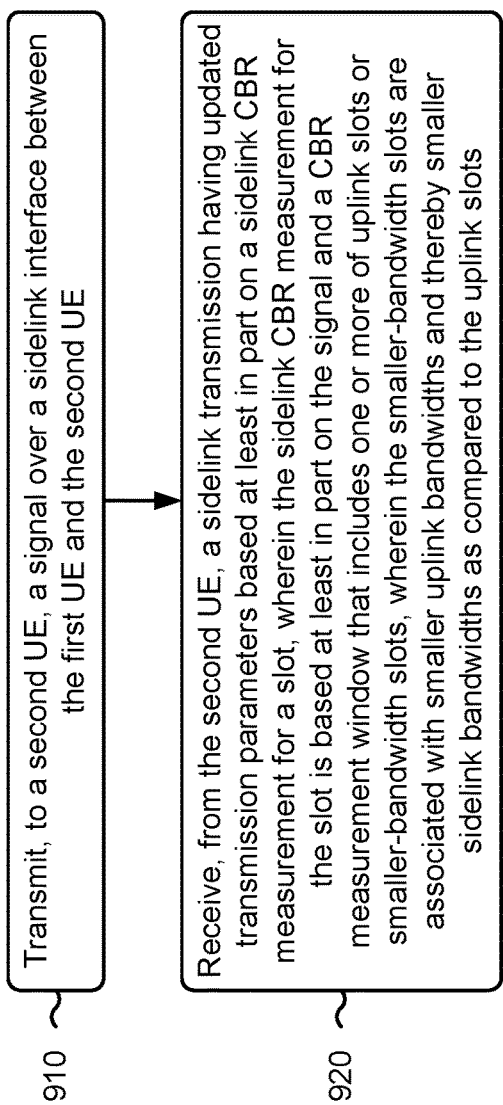

Transmit, to a second UE, a signal over a sidelink interface between the first UE and the second UE Receive, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots

SIDELINK CHANNEL BUSY RATIO MEASUREMENTS FOR SMALLER-BANDWIDTH SLOTS

CROSS-REFERENCE TO RELATED APPLICATIONS

This Patent Application is a 371 national stage of PCT Application No. PCT/US2022/071712 filed on Apr. 14, 2022, entitled "SIDELINK CHANNEL BUSY RATIO MEASUREMENTS FOR SMALLER-BANDWIDTH SLOTS." which claims priority to Greek Provisional Patent Application No. 20210100267, filed on Apr. 15, 2021, entitled "SIDELINK CHANNEL BUSY RATIO MEASUREMENTS FOR SMALLER-BANDWIDTH SLOTS," the disclosures of which are hereby expressly incorporated by reference herein.

FIELD OF THE DISCLOSURE

Aspects of the present disclosure generally relate to wireless communication and to techniques and apparatuses for sidelink channel busy ratio (CBR) measurements for smaller-bandwidth slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving, from a plurality of second UEs, a plurality of signals over sidelink interfaces between the first UE and the plurality of second UEs; and performing, to one of the plurality of second UEs, a sidelink transmission using updated transmission parameters based at least in part on a sidelink channel busy ratio (CBR) measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

In some aspects, a method of wireless communication performed by a first UE includes transmitting, to a second UE, a signal over a sidelink interface between the first UE and the second UE; and receiving, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

In some aspects, a first UE for wireless communication includes a memory and one or more processors, coupled to the memory, configured to: receive, from a plurality of second UEs, a plurality of signals over sidelink interfaces between the first UE and the plurality of second UEs; and perform, to one of the plurality of second UEs, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

In some aspects, a first UE for wireless communication includes a memory and one or more processors, coupled to the memory, configured to: transmit, to a second UE, a signal over a sidelink interface between the first UE and the second UE; and receive, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

In some aspects, a non-transitory computer-readable medium storing a set of instructions for wireless communication includes one or more instructions that, when executed by one or more processors of a first UE, cause the first UE to: receive, from a plurality of second UEs, a plurality of signals over sidelink interfaces between the first UE and the plurality of second UEs; and perform, to one of the plurality of second UEs, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

In some aspects, a non-transitory computer-readable medium storing a set of instructions for wireless communication includes one or more instructions that, when executed by one or more processors of a first UE, cause the first UE to: transmit, to a second UE, a signal over a sidelink interface between the first UE and the second UE; and receive, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

In some aspects, a first apparatus for wireless communication includes means for receiving, from a plurality of second apparatuses, a plurality of signals over sidelink interfaces between the first apparatus and the plurality of second apparatuses; and means for performing, to one of the plurality of second apparatuses, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

In some aspects, a first apparatus for wireless communication includes means for transmitting, to a second apparatus, a signal over a sidelink interface between the first apparatus and the second apparatus; and means for receiving, from the second apparatus, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example of a sidelink resource pool in an uplink portion of a slot, in accordance with the present disclosure.

FIGS. 8-9 are diagrams illustrating example processes associated with sidelink CBR measurements for smaller-bandwidth slots, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
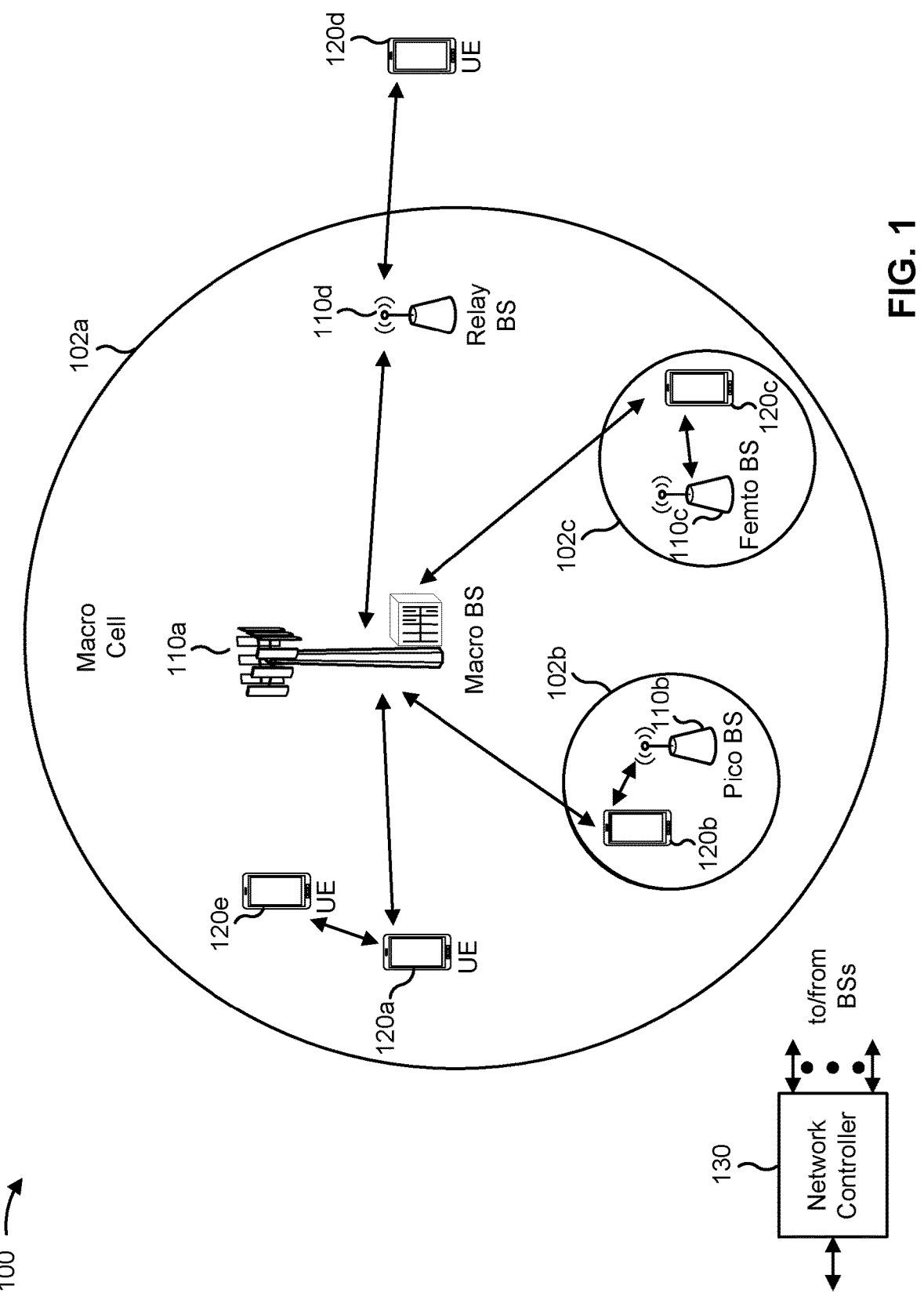
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
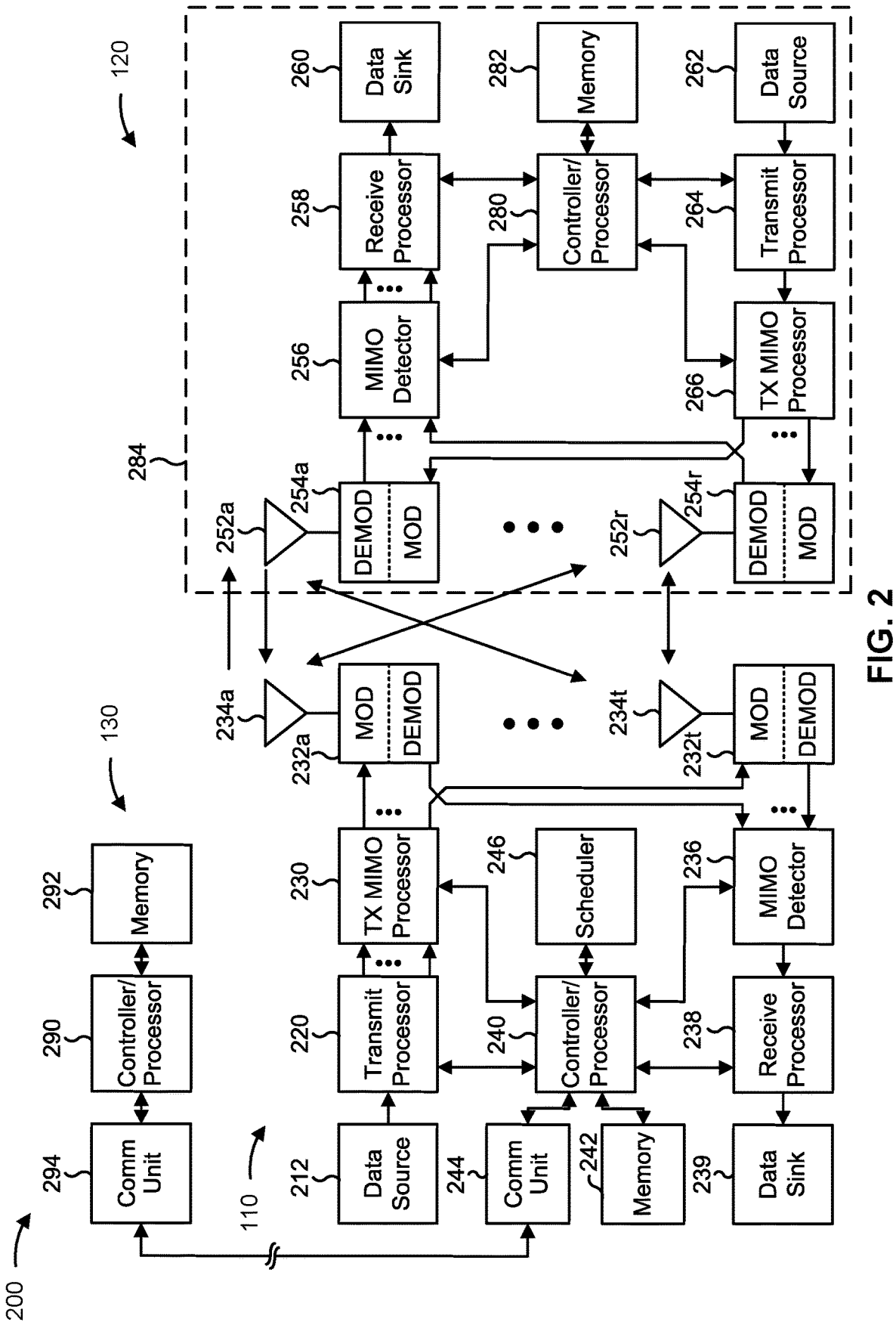
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the base station 110, the controller/processor 280 of the UE 120, and/or any other component(s) of FIG. 2 may perform one or more techniques associated with sidelink channel busy ratio (CBR) measurements for smaller-bandwidth slots, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first UE (e.g., UE 120*a*) includes means for receiving, from a plurality of second UEs (e.g., UE 120*e*), a plurality of signals over sidelink interfaces between the first UE and the plurality of second UEs; and/or means for performing, to one of the plurality of second UEs, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first UE includes means for determining a downlink-to-sidelink interference based at least in part on power level measurements of resource blocks in the smaller-bandwidth slots.

In some aspects, a first UE (e.g., UE 120*e*) includes means for transmitting, to a second UE (e.g., UE 120*a*), a signal over a sidelink interface between the first UE and the second UE; and/or means for receiving, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots. The means for the first UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
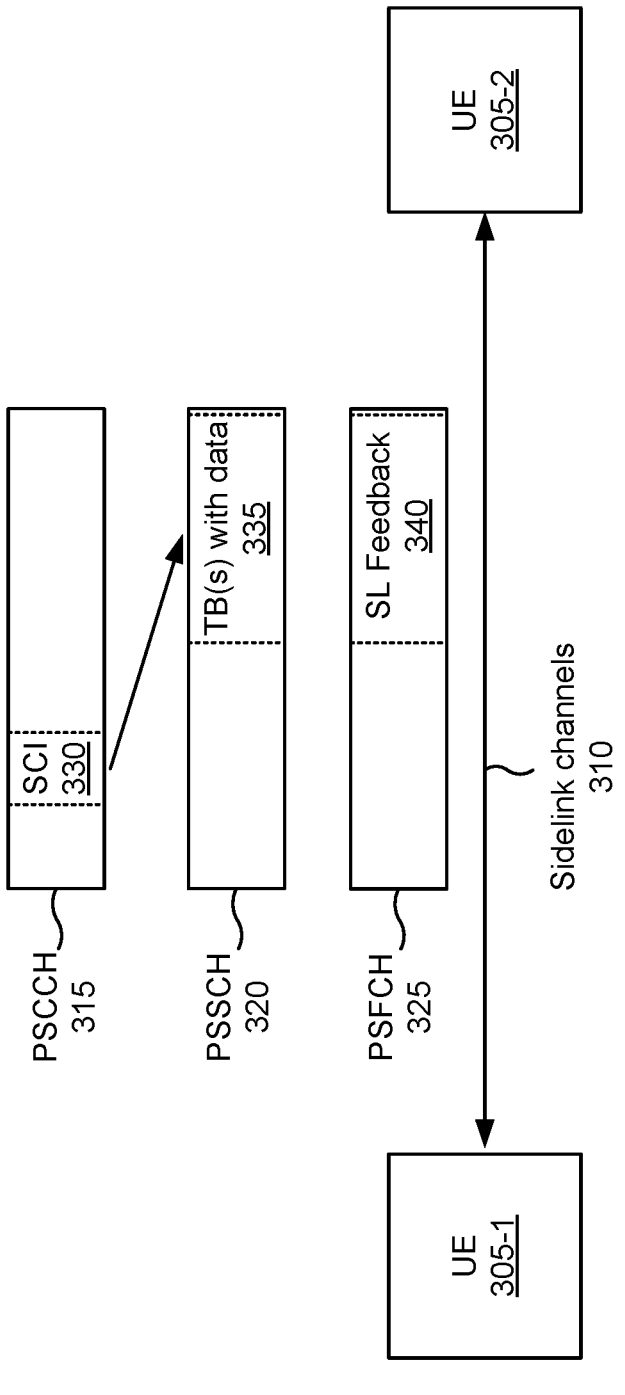
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a CBR associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
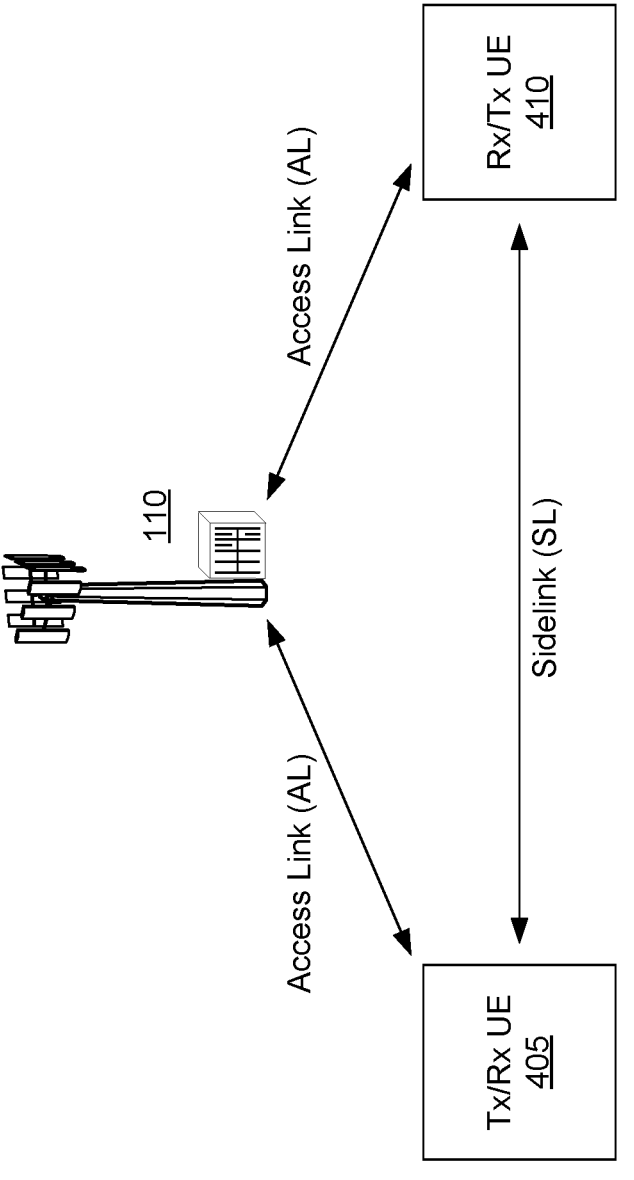
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Full-duplex communications may allow a base station (or gNB) and a UE to transmit and receive on a same set of resources, thereby providing essentially twice as much bandwidth as half-duplex communications in which only a base station or a UE is allowed to transmit or receive on a set of resources. However, full-duplex communications may be associated with various complications, such as self-interference between a downlink transmission and an uplink transmission, gNB-to-gNB interference, UE-to-UE interference, and/or additional implementation complexity.

Sub-band full-duplex (SBFD) may realize some of the benefits of full-duplex communications, while circumventing some of the complications associated with full-duplex communications. An SBFD slot may include both downlink resources and uplink resources. The SBFD slot may include some gaps budgeted across the downlink resources and the uplink resources. In other words, downlink resources and uplink resources within the SBFD slot may be separated by gaps, which may function to reduce self-interference and improve latency and uplink coverage.

A base station may signal an indication of SBFD slots in a common radio resource control (RRC) configuration via a system information block (SIB). The base station may signal a UE-specific indication of SBFD slots. In some cases, the indication of the SBFD slots may be a dynamic indication.

Figure 5:
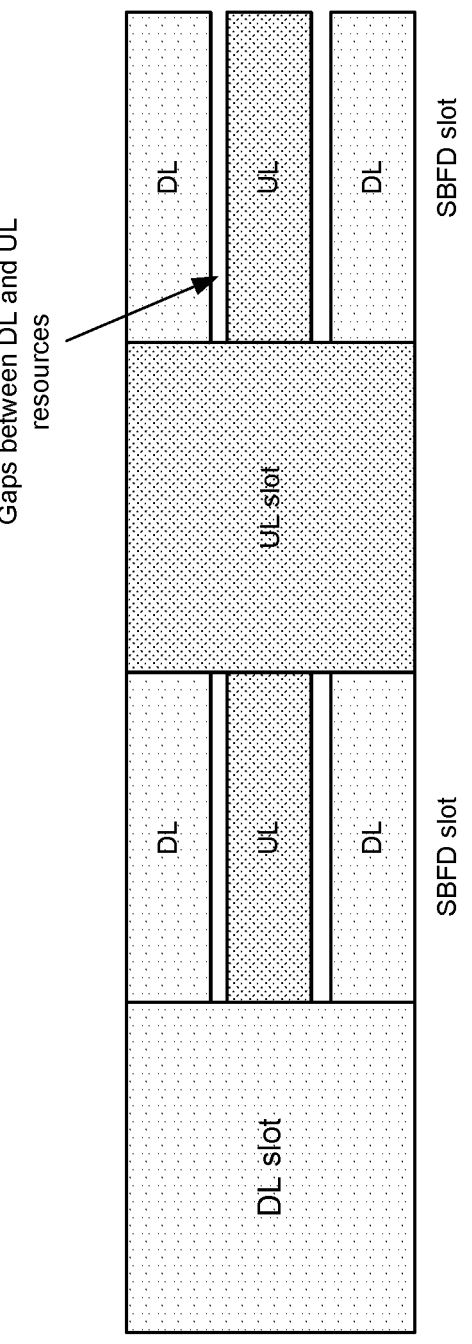
FIG. 5 is a diagram illustrating an example of a sub-band full-duplex (SBFD) slot, in accordance with the present disclosure.

FIG. 5 is a diagram illustrating an example 500 of an SBFD slot, in accordance with the present disclosure.

As shown in FIG. 5, a slot configuration may include a combination of downlink slots, uplink slots, and/or SBFD slots. An SBFD slot may include one or more downlink resources and one or more uplink resources. A downlink resource in the SBFD slot may be separated (e.g., in time and/or frequency) from an uplink resource in the SBFD slot by a gap, which may function to reduce self-interference and improve latency and uplink coverage.

As indicated above, FIG. 5 is provided as an example. Other examples may differ from what is described with respect to FIG. 5.

Sidelink communications may be performed on uplink semi-static symbols. A UE may be (pre)configured with a set of resource pools, which may be used to perform the sidelink communications. A resource pool in the set of resource pools may be defined by a set of time-frequency resources. A minimum transmission/reception (e.g., allocation) unit in time may be a subchannel, and each subchannel may be defined as a quantity of contiguous resource blocks.

The resource pool in the set of resource pools may be (pre)configured with a resource allocation mode, such as a Mode 1 resource allocation or a Mode 2 resource allocation. In the Mode 1 resource allocation, a base station may assign resources for sidelink transmissions, and both dynamic allocations via downlink control information (DCI) format 3-x and configured transmissions (both Type-1 and Type-2) may be supported. In the Mode 2 resource allocation, a UE may perform a resource sensing, and the UE may select a resource for performing a sidelink transmission based at least in part on the resource sensing. In other words, the UE may sense resources and, based at least in part on an outcome of the sensing (e.g., priorities of different transmissions and measured power levels), the UE may select the resource for performing the sidelink transmission.

In some cases, NR and sidelink operations may be performed on a same carrier, for example, in a licensed spectrum. Further, at least a base station may support SBFD, so the base station may dynamically or semi-statically signal some slots as being SBFD slots. A bandwidth of an uplink portion in an SBFD slot may be smaller than a bandwidth associated with a regular uplink slot, since the uplink portion in the SBFD slot may coexist with a downlink portion in the SBFD slot. Since a sidelink resource pool may only be defined within an uplink portion of slots (e.g., in an uplink slot or in an uplink portion of an SBFD slot), the change in bandwidth between the uplink portion in the SBFD slot and the bandwidth associated with the regular uplink slot may impact sidelink operations.

Figure 6:
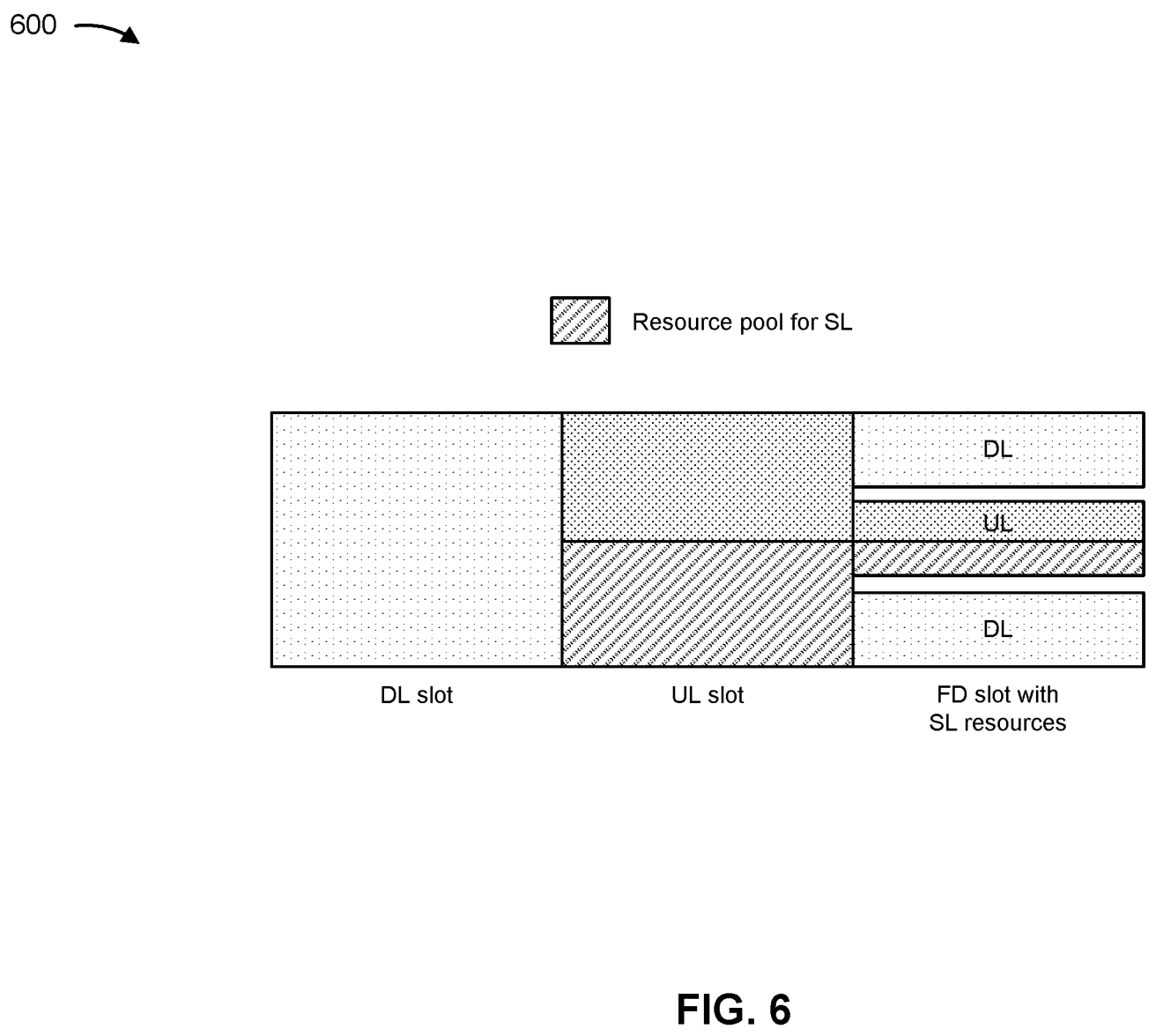

FIG. 6 is a diagram illustrating an example 600 of a sidelink resource pool in an uplink portion of a slot, in accordance with the present disclosure.

As shown in FIG. 6, a slot configuration may include a combination of downlink slots, uplink slots, and/or SBFD slots. An SBFD slot may include one or more downlink resources and one or more uplink resources. A sidelink resource pool may be defined within a portion of an uplink slot. Alternatively, or additionally, a sidelink resource pool may be defined within an uplink portion of an SBFD slot. Sidelink resource pools may not be defined within portions of downlink slots, or within downlink portions of an SBFD slot.

As indicated above, FIG. 6 is provided as an example. Other examples may differ from what is described with respect to FIG. 6.

In some aspects, a UE may measure a sidelink CBR in slot n, where the sidelink CBR may be defined as a portion of sub-channels in a resource pool whose sidelink RSSI measured by the UE satisfies (e.g., exceeds) a (pre)configured threshold sensed over a CBR measurement window [n−a, n−1], where a is equal to 100 or $100 \times 2^\mu$ slots, according to a time window size for CBR (e.g., timeWindowSize-CBR) higher layer parameter. In other words, the sidelink CBR may be based at least in part on a ratio of sub-channels with an RSSI satisfying a threshold, to a total number of sub-channels in the CBR measurement window. The sidelink CBR may be applicable for the UE in an RRC idle intra-frequency state, an RRC idle inter-frequency state, an RRC connected intra-frequency state, and/or an RRC connected inter-frequency state.

A sidelink CBR measurement may depend on a ratio of quantities of sub-channels over a measurement window of multiple slots. However, quantities of sub-channels may be different in slots of different types. For example, a quantity of sub-channels in SBFD slots may be fewer than a quantity of sub-channels in uplink slots (or sidelink slots), so a sidelink CBR measurement based at least in part on a measurement window that spans both SBFD slots and uplink slots and that does not account for differences in quantities of sub-channels in slots of different types may be inaccurate.

In various aspects of techniques and apparatuses described herein, a first UE may receive, from a second UE, a plurality of signals over a sidelink interface between the first UE and the second UE. The first UE may determine a sidelink CBR measurement for a slot based at least in part on the plurality of signals. The sidelink CBR measurement may be based at least in part on a CBR measurement window that includes uplink slots and/or SBFD slots. In some aspects, the sidelink CBR measurement may be based at least in part on a CBR measurement window that includes uplink slots and does not include SBFD slots. In some aspects, the sidelink CBR measurement may be based at least in part on a CBR measurement window that includes SBFD slots and does not include uplink slots. In some aspects, the sidelink CBR measurement may be based at least in part on a CBR measurement window that includes both uplink slots and SBFD slots, but the sidelink CBR measurement for the slot may account for the quantity of sub-channels in the uplink slots being greater than the quantity of sub-channels in the SBFD slots.

Figure 7:
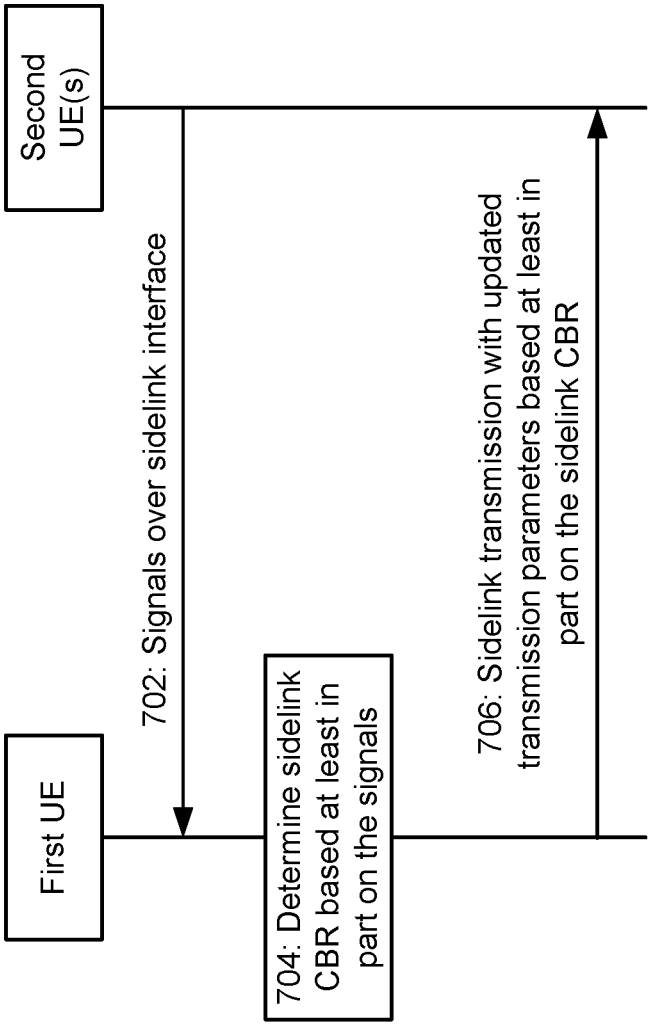
FIG. 7 is a diagram illustrating an example associated with sidelink channel busy ratio (CBR) measurements for smaller-bandwidth slots, in accordance with the present disclosure.

FIG. 7 is a diagram illustrating an example 700 of sidelink CBR measurements for smaller-bandwidth slots, in accordance with the present disclosure. As shown in FIG. 7, example 700 includes communication between a first UE (e.g., UE 120*a*) and a plurality of second UEs (e.g., UE 120*e*). In some aspects, the first UE and the plurality of second UEs may be included in a wireless network such as wireless network 100. In some aspects, the first UE and the plurality of second UEs may communicate over a sidelink.

As shown by reference number 702, the first UE may receive, from the plurality of second UEs, a plurality of signals over sidelink interfaces between the first UE and the plurality of second UEs. For example, the first UE may receive the plurality of signals via PSSCHs and/or PSCCHs.

As shown by reference number 704, the first UE may determine a sidelink CBR measurement for a slot based at least in part on the plurality of signals received over the sidelink interfaces. The sidelink CBR measurement for the slot may be based at least in part on a CBR measurement window that includes uplink slots and/or smaller-bandwidth slots. A smaller-bandwidth slot (e.g., an SBFD slot) may be associated with a smaller uplink bandwidth and thereby a smaller sidelink bandwidth as compared to an uplink slot. In some aspects, the first UE may determine the sidelink CBR measurement for the slot based at least in part on a ratio of a quantity of sub-channels in a resource pool having a power level (e.g., a sidelink RSSI) that satisfies a threshold, to a total quantity of sub-channels in the CBR measurement window.

In some aspects, a quantity of sub-channels in an uplink slot may be different than a quantity of sub-channels in a smaller-bandwidth slot. For example, the quantity of sub-channels in the uplink slot may be greater than the quantity of sub-channels in the smaller-bandwidth slot. As a result, a sidelink CBR measurement may be based at least in part on the unequal quantity of sub-channels in the uplink slot versus the smaller-bandwidth slot. In some aspects, a resource pool associated with the smaller-bandwidth slot may be associated with a smaller bandwidth as compared to a resource pool associated with the uplink slot. In other words, the resource pool of the smaller-bandwidth slot may have a smaller bandwidth than the resource pool of the uplink slot.

In some aspects, the CBR measurement window may include uplink slots and may not include smaller-bandwidth slots. In some aspects, the CBR measurement window may include smaller-bandwidth slots and may not include uplink slots. In other words, a sidelink CBR measurement may be limited to slots of a same type (for example, only uplink slots (or sidelink slots), or only smaller-bandwidth slots). In this case, a sidelink CBR measurement may be based at least in part on uplink slots and not smaller-bandwidth slots, or alternatively, a sidelink CBR measurement may be based at least in part on smaller-bandwidth slots and not uplink slots.

In some aspects, the CBR measurement window may include both uplink slots and smaller-bandwidth slots, and the sidelink CBR measurement for the slot may be based at least in part on the quantity of sub-channels in an uplink slot being greater than the quantity of sub-channels in a smaller-bandwidth slot. In other words, the CBR measurement window may include slots of different types (e.g., both uplink slots and smaller-bandwidth slots), and the first UE may determine the ratio of sub-channels based at least in part on the smaller-bandwidth slots having a fewer quantity of sub-channels as compared to the uplink slots.

In some aspects, the sidelink CBR measurement for the slot may be based on a first threshold associated with the uplink slots and/or a second threshold associated with the smaller-bandwidth slots. The first threshold associated with the uplink slots may be less than the second threshold associated with the smaller-bandwidth slots. The first threshold and the second threshold may be RSSI thresholds. Since smaller-bandwidth slots may be prone to downlink-to-uplink interference, the RSSI thresholds may be (pre)configured separately for the uplink slots (or sidelink slots) and the smaller-bandwidth slots. In some aspects, an RSSI threshold for the smaller-bandwidth slots may be configured to be larger than an RSSI threshold for the uplink slots, since an RSSI in the smaller-bandwidth slots may be based at least in part on both sidelink activity and downlink-to-uplink interference, so a higher RSSI may not necessarily imply higher sidelink activity.

In some aspects, the first UE may determine a downlink-to-sidelink interference based at least in part on power level measurements of resource blocks in the smaller-bandwidth slots. In other words, the first UE may measure an RSSI associated with resource blocks in the smaller-bandwidth slots to determine the downlink-to-sidelink interference. The first UE may measure the RSSI associated with the resource blocks in the smaller-bandwidth slots, in addition to measuring an RSRP associated with the resource blocks to determine whether a resource is available or not for a mode 2 resource allocation. Further, the first UE may subtract the downlink-to-sidelink interference from the measured RSRP before determining whether the resource is available or not when the UE is operating under the mode 2 resource allocation.

As shown by reference number 706, the first UE may perform, to one of the plurality of second UEs, a sidelink transmission using updated transmission parameters based at least in part on the sidelink CBR measurement for the slot. The first UE may determine the updated transmission parameters based at least in part on the sidelink CBR measurement for the slot. For example, the first UE may select the updated transmission parameters to mitigate an effect of a relatively high CBR, and the first UE may apply the updated transmission parameters to subsequent sidelink transmissions.

As indicated above, FIG. 7 is provided as an example. Other examples may differ from what is described with regard to FIG. 7.

FIG. 8 is a diagram illustrating an example process 800 performed, for example, by a first UE, in accordance with the present disclosure. Example process 800 is an example where the first UE (e.g., UE 120*a*) performs operations associated with sidelink CBR measurements for smaller-bandwidth slots.

As shown in FIG. 8, in some aspects, process 800 may include receiving, from a plurality of second UEs, a plurality of signals over sidelink interfaces between the first UE and the plurality of second UEs (block 810). For example, the first UE (e.g., using reception component 1002, depicted in FIG. 10) may receive, from a plurality of second UEs, a plurality of signals over sidelink interfaces between the first UE and the plurality of second UEs, as described above.

As further shown in FIG. 8, in some aspects, process 800 may include performing, to one of the plurality of second UEs, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots (block 820). For example, the first UE (e.g., using transmission component 1004, depicted in FIG. 10) may perform, to one of the plurality of second UEs, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots, as described above.

Process 800 may include additional aspects, such as any single aspect or any combination of aspects described below and/or in connection with one or more other processes described elsewhere herein.

In a first aspect, the sidelink CBR measurement for the slot is based at least in part on a ratio of sub-channels in a resource pool having a power level that satisfies a threshold to a total number of sub-channels in the CBR measurement window.

In a second aspect, alone or in combination with the first aspect, a quantity of sub-channels in one of the uplink slots is different than a quantity of sub-channels in one of the smaller-bandwidth slots.

In a third aspect, alone or in combination with one or more of the first and second aspects, the CBR measurement window includes uplink slots and does not include smaller-bandwidth slots.

In a fourth aspect, alone or in combination with one or more of the first through third aspects, the CBR measurement window includes smaller-bandwidth slots and does not include uplink slots.

In a fifth aspect, alone or in combination with one or more of the first through fourth aspects, the CBR measurement window includes uplink slots and smaller-bandwidth slots, and the sidelink CBR measurement for the slot is based at least in part on a quantity of sub-channels in one of the uplink slots being greater than a quantity of sub-channels in one of the smaller-bandwidth slots.

In a sixth aspect, alone or in combination with one or more of the first through fifth aspects, the sidelink CBR measurement for the slot is based at least in part on one or more of a first threshold associated with the uplink slots or a second threshold associated with the smaller-bandwidth slots.

In a seventh aspect, alone or in combination with one or more of the first through sixth aspects, the first threshold associated with the uplink slots is less than the second threshold associated with the smaller-bandwidth slots.

In an eighth aspect, alone or in combination with one or more of the first through seventh aspects, the sidelink CBR measurement for the slot is based at least in part on power levels of sub-channels in a resource pool, wherein the power levels are based at least in part on received signal strength indicator measurements.

In a ninth aspect, alone or in combination with one or more of the first through eighth aspects, process 800 includes determining a downlink-to-sidelink interference based at least in part on power level measurements of resource blocks in the smaller-bandwidth slots.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a first UE, in accordance with the present disclosure. Example process 900 is an example where the first UE (e.g., UE 120*a*) performs operations associated with sidelink CBR measurements for smaller-bandwidth slots.

As shown in FIG. 9, in some aspects, process 900 may include transmitting, to a second UE, a signal over a sidelink interface between the first UE and the second UE (block 910). For example, the first UE (e.g., using transmission component 1004, depicted in FIG. 10) may transmit, to a second UE, a signal over a sidelink interface between the first UE and the second UE, as described above.

As further shown in FIG. 9, in some aspects, process 900 may include receiving, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots (block 920). For example, the first UE (e.g., using reception component 1002, depicted in FIG. 10) may receive, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots, as described above.

Process 900 may include additional aspects, such as any single aspect or any combination of aspects described below and/or in connection with one or more other processes described elsewhere herein.

In a first aspect, the sidelink CBR measurement for the slot is based at least in part on a ratio of sub-channels in a resource pool having a power level that satisfies a threshold to a total number of sub-channels in the CBR measurement window.

In a second aspect, alone or in combination with the first aspect, a quantity of sub-channels in one of the uplink slots is different than a quantity of sub-channels in one of the smaller-bandwidth slots.

In a third aspect, alone or in combination with one or more of the first and second aspects, the CBR measurement window includes uplink slots and does not include smaller-bandwidth slots.

In a fourth aspect, alone or in combination with one or more of the first through third aspects, the CBR measurement window includes smaller-bandwidth slots and does not include uplink slots.

In a fifth aspect, alone or in combination with one or more of the first through fourth aspects, the CBR measurement window includes uplink slots and smaller-bandwidth slots, and the sidelink CBR measurement for the slot is based at least in part on a quantity of sub-channels in one of the uplink slots being greater than a quantity of sub-channels in one of the smaller-bandwidth slots.

In a sixth aspect, alone or in combination with one or more of the first through fifth aspects, the sidelink CBR measurement for the slot is based at least in part on one or more of a first threshold associated with the uplink slots or a second threshold associated with the smaller-bandwidth slots.

In a seventh aspect, alone or in combination with one or more of the first through sixth aspects, the first threshold associated with the uplink slots is less than the second threshold associated with the smaller-bandwidth slots.

In an eighth aspect, alone or in combination with one or more of the first through seventh aspects, the sidelink CBR measurement for the slot is based at least in part on power levels of sub-channels in a resource pool, wherein the power levels are based at least in part on received signal strength indicator measurements.

In a ninth aspect, alone or in combination with one or more of the first through eighth aspects, a downlink-to-sidelink interference is based at least in part on power level measurements of resource blocks in the smaller-bandwidth slots.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
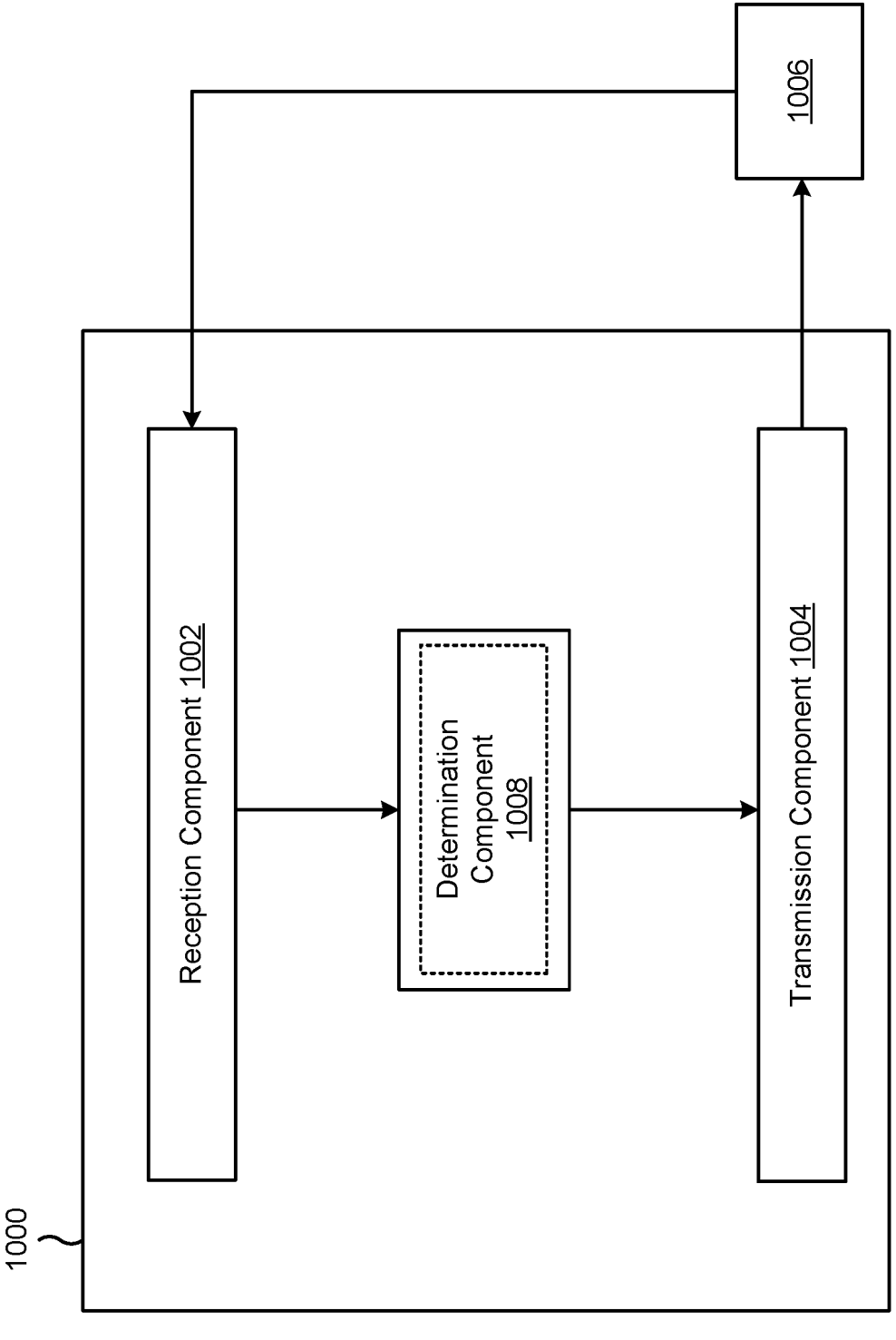
FIG. 10 is a block diagram of an example apparatus for wireless communication, in accordance with the present disclosure.

FIG. 10 is a block diagram of an example apparatus 1000 for wireless communication. The apparatus 1000 may be a first UE, or a first UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, process 900 of FIG. 9, or a combination thereof. In some aspects, the apparatus 1000 and/or one or more components shown in FIG. 10 may include one or more components of the first UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the first UE described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the first UE described above in connection with FIG. 2. In some aspects, the transmission component 1004 may be co-located with the reception component 1002 in a transceiver.

The reception component 1002 may receive, from a plurality of second UEs, a plurality of signals over sidelink interfaces between the first UE and the plurality of second UEs. The transmission component 1004 may perform, to one of the plurality of second UEs, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots. The determination component 1008 may determine a downlink-to-sidelink interference based at least in part on power level measurements of resource blocks in the smaller-bandwidth slots.

The transmission component 1004 may transmit, to a second UE, a signal over a sidelink interface between the first UE and the second UE. The reception component 1002 may receive, from the second UE, a sidelink transmission having updated transmission parameters based at least in part on a sidelink CBR measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first user equipment (UE), comprising: receiving, from a plurality of second UEs, a plurality of signals over sidelink interfaces between the first UE and the plurality of second UEs; and performing, to one of the plurality of second UEs, a sidelink transmission using updated transmission parameters based at least in part on a sidelink CBR measurement for a slot, wherein the sidelink CBR measurement for the slot is based at least in part on the plurality of signals and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

Aspect 2: The method of Aspect 1, wherein the sidelink CBR measurement for the slot is based at least in part on a ratio of sub-channels in a resource pool having a power level that satisfies a threshold to a total number of sub-channels in the CBR measurement window.

Aspect 3: The method of any of Aspects 1 through 2, wherein a quantity of sub-channels in one of the uplink slots is different than a quantity of sub-channels in one of the smaller-bandwidth slots.

Aspect 4: The method of any of Aspects 1 through 3, wherein the CBR measurement window includes uplink slots and does not include smaller-bandwidth slots.

Aspect 5: The method of any of Aspects 1 through 4, wherein the CBR measurement window includes smaller-bandwidth slots and does not include uplink slots.

Aspect 6: The method of any of Aspects 1 through 5, wherein the CBR measurement window includes uplink slots and smaller-bandwidth slots, and wherein the sidelink CBR measurement for the slot is based at least in part on a quantity of sub-channels in one of the uplink slots being greater than a quantity of sub-channels in one of the smaller-bandwidth slots.

Aspect 7: The method of any of Aspects 1 through 6, wherein the sidelink CBR measurement for the slot is based at least in part on one or more of: a first threshold associated with the uplink slots or a second threshold associated with the smaller-bandwidth slots.

Aspect 8: The method of Aspect 7, wherein the first threshold associated with the uplink slots is less than the second threshold associated with the smaller-bandwidth slots.

Aspect 9: The method of any of Aspects 1 through 8, wherein the sidelink CBR measurement for the slot is based at least in part on power levels of sub-channels in a resource pool, wherein the power levels are based at least in part on received signal strength indicator measurements.

Aspect 10: The method of any of Aspects 1 through 9, further comprising: determining a downlink-to-sidelink interference based at least in part on power level measurements of resource blocks in the smaller-bandwidth slots.

Aspect 11: A method of wireless communication performed by a first user equipment (UE), comprising: transmitting, to a second UE, a signal over a sidelink interface between the first UE and the second UE; and receiving, from the second UE, a sidelink transmission having updated transmission parameters based at least in part on a sidelink channel busy ratio (CBR) measurement for a slot, wherein the sidelink CBR measurement for the slot is based at least in part on the signal and a CBR measurement window that includes one or more of uplink slots or smaller-bandwidth slots, wherein the smaller-bandwidth slots are associated with smaller uplink bandwidths and thereby smaller sidelink bandwidths as compared to the uplink slots.

Aspect 12: The method of Aspect 11, wherein the sidelink CBR measurement for the slot is based at least in part on a ratio of sub-channels in a resource pool having a power level that satisfies a threshold to a total number of sub-channels in the CBR measurement window.

Aspect 13: The method of any of Aspects 10 through 12, wherein a quantity of sub-channels in one of the uplink slots is different than a quantity of sub-channels in one of the smaller-bandwidth slots.

Aspect 14: The method of any of Aspects 10 through 13, wherein the CBR measurement window includes uplink slots and does not include smaller-bandwidth slots.

Aspect 15: The method of any of Aspects 10 through 14, wherein the CBR measurement window includes smaller-bandwidth slots and does not include uplink slots.

Aspect 16: The method of any of Aspects 10 through 15, wherein the CBR measurement window includes uplink slots and smaller-bandwidth slots, and wherein the sidelink CBR measurement for the slot is based at least in part on a quantity of sub-channels in one of the uplink slots being greater than a quantity of sub-channels in one of the smaller-bandwidth slots.

Aspect 17: The method of any of Aspects 10 through 16, wherein the sidelink CBR measurement for the slot is based at least in part on one or more of: a first threshold associated with the uplink slots or a second threshold associated with the smaller-bandwidth slots.

Aspect 18: The method of Aspect 17, wherein the first threshold associated with the uplink slots is less than the second threshold associated with the smaller-bandwidth slots.

Aspect 19: The method of any of Aspects 10 through 18, wherein the sidelink CBR measurement for the slot is based at least in part on power levels of sub-channels in a resource pool, wherein the power levels are based at least in part on received signal strength indicator measurements.

Aspect 20: The method of any of Aspects 10 through 19, wherein a downlink-to-sidelink interference is based at least in part on power level measurements of resource blocks in the smaller-bandwidth slots.

Aspect 21: An apparatus for wireless communication at a device, comprising a processor; memory coupled with the processor; and instructions stored in the memory and executable by the processor to cause the apparatus to perform the method of one or more of Aspects 1-10.

Aspect 22: A device for wireless communication, comprising a memory and one or more processors, coupled to the memory, configured to perform the method of one or more of Aspects 1-10.

Aspect 23: An apparatus for wireless communication, comprising at least one means for performing the method of one or more of Aspects 1-10.

Aspect 24: A non-transitory computer-readable medium storing code for wireless communication, the code comprising instructions executable by a processor to perform the method of one or more of Aspects 1-10.

Aspect 25: A non-transitory computer-readable medium storing a set of instructions for wireless communication, the set of instructions comprising one or more instructions that, when executed by one or more processors of a device, cause the device to perform the method of one or more of Aspects 1-10.

Aspect 26: An apparatus for wireless communication at a device, comprising a processor; memory coupled with the processor; and instructions stored in the memory and executable by the processor to cause the apparatus to perform the method of one or more of Aspects 11-20.

Aspect 27: A device for wireless communication, comprising a memory and one or more processors, coupled to the memory, configured to perform the method of one or more of Aspects 11-20.

Aspect 28: An apparatus for wireless communication, comprising at least one means for performing the method of one or more of Aspects 11-20.

Aspect 29: A non-transitory computer-readable medium storing code for wireless communication, the code comprising instructions executable by a processor to perform the method of one or more of Aspects 11-20.

Aspect 30: A non-transitory computer-readable medium storing a set of instructions for wireless communication, the set of instructions comprising one or more instructions that, when executed by one or more processors of a device, cause the device to perform the method of one or more of Aspects 11-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus of a first user equipment (UE) for wireless communication, comprising:
   a memory; and
   one or more processors, coupled to the memory, configured to:
      receive, from a plurality of second UEs, a plurality of signals over sidelink interfaces between the first UE and the plurality of second UEs; and
      perform, to one of the plurality of second UEs, a sidelink transmission using updated transmission parameters based at least in part on a sidelink channel busy ratio (CBR) measurement for a slot, wherein the sidelink CBR measurement for the slot is based at least in part on the plurality of signals and a CBR measurement window that includes one or more of uplink slots and smaller-bandwidth slots, wherein the smaller-bandwidth slots are associated with smaller uplink bandwidths and thereby smaller sidelink bandwidths as compared to the uplink slots, and wherein the sidelink CBR measurement for the slot is based at least in part on a quantity of sub-channels in one of the uplink slots being greater than a quantity of sub-channels in one of the smaller-bandwidth slots.

2. The apparatus of claim 1, wherein the sidelink CBR measurement for the slot is based at least in part on a ratio of sub-channels in a resource pool having a power level that satisfies a threshold to a total number of sub-channels in the CBR measurement window.

3. The apparatus of claim 1, wherein a resource pool associated with one of the smaller-bandwidth slots is associated with a smaller bandwidth as compared to a resource pool associated with one of the uplink slots.

4. The apparatus of claim 1, wherein the sidelink CBR measurement for the slot is based at least in part on one or more of: a first threshold associated with the uplink slots or a second threshold associated with the smaller-bandwidth slots.

5. The apparatus of claim 4, wherein the first threshold associated with the uplink slots is less than the second threshold associated with the smaller-bandwidth slots.

6. The apparatus of claim 1, wherein the sidelink CBR measurement for the slot is based at least in part on power levels of sub-channels in a resource pool, wherein the power levels are based at least in part on received signal strength indicator measurements.

7. The apparatus of claim 1, wherein the one or more processors are further configured to:
   determine a downlink-to-sidelink interference based at least in part on power level measurements of resource blocks in the smaller-bandwidth slots.

8. An apparatus of a first user equipment (UE) for wireless communication, comprising:
   a memory; and
   one or more processors, coupled to the memory, configured to:
      transmit, to a second UE, a signal over a sidelink interface between the first UE and the second UE; and
      receive, from the second UE, a sidelink transmission having updated transmission parameters based at least in part on a sidelink channel busy ratio (CBR) measurement for a slot, wherein the sidelink CBR measurement for the slot is based at least in part on the signal and a CBR measurement window that includes one or more of uplink slots and smaller-bandwidth slots, wherein the smaller-bandwidth slots are associated with smaller uplink bandwidths and thereby smaller sidelink bandwidths as compared to the uplink slots, and wherein the sidelink CBR measurement for the slot is based at least in part on a quantity of sub-channels in one of the uplink slots being greater than a quantity of sub-channels in one of the smaller-bandwidth slots.

9. The apparatus of claim 8, wherein the sidelink CBR measurement for the slot is based at least in part on a ratio of sub-channels in a resource pool having a power level that satisfies a threshold to a total number of sub-channels in the CBR measurement window.

10. The apparatus of claim 8,
   wherein a resource pool associated with one of the smaller-bandwidth slots is associated with a smaller bandwidth as compared to a resource pool associated with one of the uplink slots.

11. The apparatus of claim 8, wherein the sidelink CBR measurement for the slot is based at least in part on one or more of: a first threshold associated with the uplink slots or a second threshold associated with the smaller-bandwidth slots.

12. The apparatus of claim 11, wherein the first threshold associated with the uplink slots is less than the second threshold associated with the smaller-bandwidth slots.

13. The apparatus of claim 8, wherein the sidelink CBR measurement for the slot is based at least in part on power levels of sub-channels in a resource pool, wherein the power levels are based at least in part on received signal strength indicator measurements.

14. The apparatus of claim 8, wherein a downlink-to-sidelink interference is based at least in part on power level measurements of resource blocks in the smaller-bandwidth slots.

15. A method of wireless communication performed by a first user equipment (UE), comprising:

receiving, from a plurality of second UEs, a plurality of signals over sidelink interfaces between the first UE and the plurality of second UEs; and performing, to one of the plurality of second UEs, a sidelink transmission using updated transmission parameters based at least in part on a sidelink channel busy ratio (CBR) measurement for a slot, wherein the sidelink CBR measurement for the slot is based at least in part on the plurality of signals and a CBR measurement window that includes one or more of uplink slots and smaller-bandwidth slots, wherein the smaller-bandwidth slots are associated with smaller uplink bandwidths and thereby smaller sidelink bandwidths as compared to the uplink slots, and wherein the sidelink CBR measurement for the slot is based at least in part on a quantity of sub-channels in one of the uplink slots being greater than a quantity of sub-channels in one of the smaller-bandwidth slots.

16. The method of claim 15, wherein the sidelink CBR measurement for the slot is based at least in part on one or more of: a first threshold associated with the uplink slots or a second threshold associated with the smaller-bandwidth slots, and wherein the first threshold associated with the uplink slots is less than the second threshold associated with the smaller-bandwidth slots.

17. A method of wireless communication performed by a first user equipment (UE), comprising:

transmitting, to a second UE, a signal over a sidelink interface between the first UE and the second UE; and receiving, from the second UE, a sidelink transmission having updated transmission parameters based at least in part on a sidelink channel busy ratio (CBR) measurement for a slot, wherein the sidelink CBR measurement for the slot is based at least in part on the signal and a CBR measurement window that includes one or more of uplink slots and smaller-bandwidth slots, wherein the smaller-bandwidth slots are associated with smaller uplink bandwidths and thereby smaller sidelink bandwidths as compared to the uplink slots, and wherein the sidelink CBR measurement for the slot is based at least in part on a quantity of sub-channels in one of the uplink slots being greater than a quantity of sub-channels in one of the smaller-bandwidth slots.

18. The method of claim 17, wherein the sidelink CBR measurement for the slot is based at least in part on one or more of: a first threshold associated with the uplink slots or a second threshold associated with the smaller-bandwidth slots, and wherein the first threshold associated with the uplink slots is less than the second threshold associated with the smaller-bandwidth slots.

19. The method of claim 15, wherein the sidelink CBR measurement for the slot is based at least in part on a ratio of sub-channels in a resource pool having a power level that satisfies a threshold to a total number of sub-channels in the CBR measurement window.

20. The method of claim 15, wherein a resource pool associated with one of the smaller-bandwidth slots is associated with a smaller bandwidth as compared to a resource pool associated with one of the uplink slots.

21. The method of claim 15, wherein the sidelink CBR measurement for the slot is based at least in part on power levels of sub-channels in a resource pool, wherein the power levels are based at least in part on received signal strength indicator measurements.

22. The method of claim 15, further comprising:

determining a downlink-to-sidelink interference based at least in part on power level measurements of resource blocks in the smaller-bandwidth slots.

23. The method of claim 17, wherein the sidelink CBR measurement for the slot is based at least in part on a ratio of sub-channels in a resource pool having a power level that satisfies a threshold to a total number of sub-channels in the CBR measurement window.

24. The method of claim 17, wherein a resource pool associated with one of the smaller-bandwidth slots is associated with a smaller bandwidth as compared to a resource pool associated with one of the uplink slots.

25. The method of claim 17, wherein the sidelink CBR measurement for the slot is based at least in part on power levels of sub-channels in a resource pool, wherein the power levels are based at least in part on received signal strength indicator measurements.

26. The method of claim 17, wherein a downlink-to-sidelink interference is based at least in part on power level measurements of resource blocks in the smaller-bandwidth slots.

* * * * *